(No Model.)
C. LEDERER.
AUTOMATIC CAR SCALE.
No. 283,619.　　　　　　　　　　Patented Aug. 21, 1883.
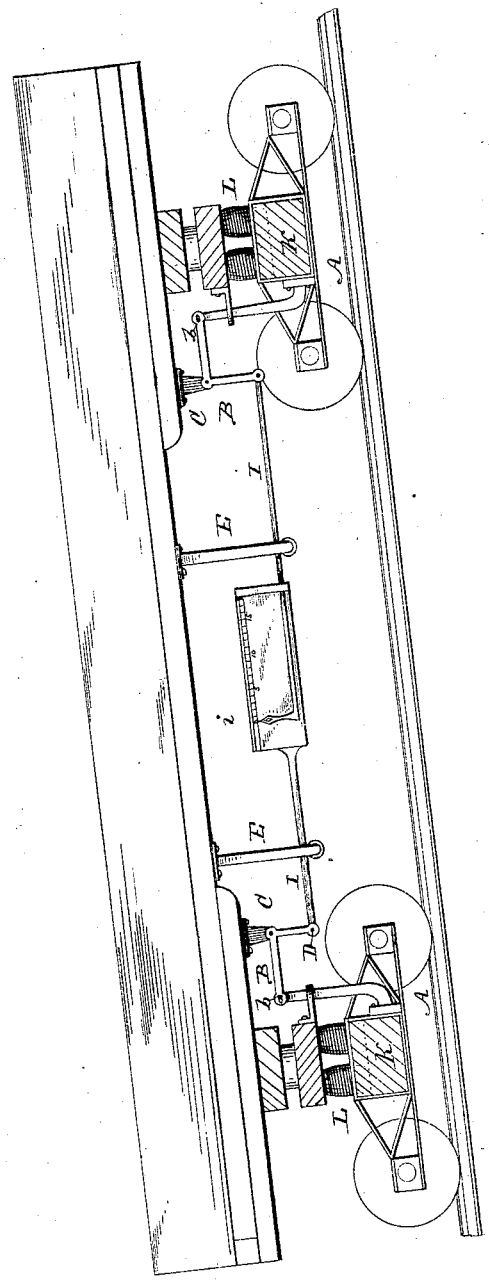
WITNESSES:
Thos Houghton.
W. X. Stevens.
INVENTOR:
Chas Lederer
BY Munn
ATTORNEYS.

UNITED STATES PATENT OFFICE.

CHARLES LEDERER, OF NORFOLK, NEBRASKA, ASSIGNOR TO BERNHARD W. JONAS AND CHARLES M. SELBY, OF SAME PLACE.

AUTOMATIC CAR-SCALE.

SPECIFICATION forming part of Letters Patent No. 283,619, dated August 21, 1883.

Application filed June 21, 1883. (No model.)

*To all whom it may concern:*

Be it known that I, CHARLES LEDERER, a citizen of the United States, residing at Norfolk, in the county of Madison and State of Nebraska, have invented a new and useful Improvement in Automatic Car-Scales, of which the following is a specification.

My invention relates to scales for weighing cars and their contents; and it has for its object to provide a registering device for attachment to each car, which shall be scaled to show relative to the springs the weight of the car-body and its load.

To this end it consists in the construction and combination of parts hereinafter described and claimed, reference being had to the accompanying drawing, which is a longitudinal vertical section, part in elevation, of a platform-car, showing my invention in side elevation.

A represents a bracket or angle-iron, which is firmly bolted at its lower end to that cross-timber, K, of the car-truck on which the springs L rest. The car, its truck, and springs may all be of any usual style.

B is a bell-crank lever pivoted at C to the body of the car, which body rests upon the springs L. This lever B is connected at one end with bracket A by means of a pin, b, in the bracket, passing through a horizontal slot in the lever, and at the other end by a pin, D, to a rod, I, which passes through post E, and is supported thereby.

All the parts thus far described are attached to each end of the car, and the two rods I approach and overlap each other, the end of one rod being provided with a pointer, i, and the end of the other rod having a scale, with which the pointer registers. This pointer and scale may be adjusted relative to each other to bring the pointer to 0 when the empty car rests on its springs in any usual manner. The horizontal slot in the end of lever B is to permit the lever to draw endwise on pin b in descending. The action is as follows: When a load is placed on the car, the springs are depressed and the car descends, carrying with it the fulcra of levers B and the scale and pointer; but the outer ends of levers B are held in fixed relation to the spring-supports by means of brackets A, so that said ends of levers B do not descend. This causes the two rods I to recede from their common center, and the pointer being moved along the scale, the weight of the load is indicated thereby.

As a modification of this device, both rods I may be provided with pointers, and each may have its registering-scale fixed to the car-body, so that the weights on each end of the car will be separately shown. No effort is here made to show accurately any particular kind of springs and mountings. The only requirement is that the bracket A be fixed to the axle-boxes or some part resting thereon, or to a stationary part of the truck connected thereto and not supported by the springs, and that the fulcrum of lever B shall be fixed to some part of the car which is supported by the springs. This results practically in registering the amount of depression of the springs under different loads, and the springs should be adapted as usual for weighing-scales acting on this principle.

What I claim as my invention, and wish to secure by Letters Patent, is—

The combination, with a car mounted on wheels, by means of bearings resting on the wheel-axles and springs interposed between the car-body and the wheel-bearings, of brackets attached to said bearings, bell-crank levers pivoted to the car-body and connected at one end to said brackets, and registering-scales connected with the other ends of said bell-crank levers, as specified.

CHARLES LEDERER.

Witnesses:
A. J. DURLAND,
H. C. BROME.